United States Patent
Pflueger et al.

(10) Patent No.: US 10,300,418 B2
(45) Date of Patent: May 28, 2019

(54) FILTER INSERT FOR A FILTER DEVICE

(71) Applicant: Mann+Hummel GMBH, Ludwigsburg (DE)

(72) Inventors: Frank Pflueger, Sachsenheim (DE); Fabian Wagner, Moeglingen (DE); Matthias Krohlow, Herrenberg (DE); Daniel Schmid, Sachsenheim (DE); Joerg Menssen, Markgroeningen (DE); Stefan Walz, Freiberg (DE); Christof Mangold, Muenchingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 284 days.

(21) Appl. No.: 15/158,797

(22) Filed: May 19, 2016

(65) Prior Publication Data

US 2016/0263508 A1    Sep. 15, 2016

Related U.S. Application Data

(63) Continuation of application No. PCT/EP2014/074985, filed on Nov. 19, 2014.

(30) Foreign Application Priority Data

Nov. 19, 2013   (DE) .................. 10 2013 019 290

(51) Int. Cl.
*B01D 46/00* (2006.01)
*B01D 46/24* (2006.01)
*B01D 46/52* (2006.01)

(52) U.S. Cl.
CPC ....... *B01D 46/001* (2013.01); *B01D 46/0047* (2013.01); *B01D 46/2411* (2013.01); *B01D 46/521* (2013.01); *B01D 2275/201* (2013.01); *B01D 2275/206* (2013.01)

(58) Field of Classification Search
CPC .............. B01D 46/001; B01D 46/0047; B01D 46/2411; B01D 46/521; B01D 2275/201; B01D 2275/206; B01D 46/24; B01D 46/2403
See application file for complete search history.

(56) References Cited

U.S. PATENT DOCUMENTS

| | | | |
|---|---|---|---|
| 2,720,279 | A | 10/1955 | James |
| 4,640,698 | A | 2/1987 | Ohishi et al. |
| 5,037,460 | A | 8/1991 | Machado |
| 6,059,851 | A | 5/2000 | Depietro et al. |

(Continued)

FOREIGN PATENT DOCUMENTS

| DE | 3502698 A1 | 7/1986 |
|---|---|---|
| DE | 102011083657 A1 | 3/2013 |

(Continued)

*Primary Examiner* — Robert Clemente
(74) *Attorney, Agent, or Firm* — James Hasselbeck

(57) ABSTRACT

A filter insert for a filter device, having a filter element arranged on a longitudinal axis extending there through and a front-side flow opening arranged on the front side of the filter element with the longitudinal axis extending through the flow opening. The filter element has, with respect to the longitudinal axis, at least one flattened portion with a reduced radial extension or a through hole along the periphery of the flow opening the shortest interior distance in the filter element immediately adjacent to the front-side flow opening is shorter than the inside diameter of the front-side flow opening.

25 Claims, 12 Drawing Sheets

(56) References Cited

U.S. PATENT DOCUMENTS

| | | |
|---|---|---|
| 8,157,883 B2 | 4/2012 | Felber et al. |
| 8,551,205 B2 | 10/2013 | Berisha et al. |
| 8,585,794 B2 | 11/2013 | Sudermann |
| 2007/0157589 A1 | 7/2007 | Haberkamp |
| 2011/0083408 A1 | 4/2011 | Raether et al. |
| 2015/0007535 A1 | 1/2015 | Hasenfratz et al. |

FOREIGN PATENT DOCUMENTS

| | | |
|---|---|---|
| DE | 102012012348 A1 | 12/2013 |
| EP | 2676713 A1 | 12/2013 |
| FR | 2063849 A5 | 7/1971 |
| GB | 562103 A | 6/1944 |
| GB | 2159434 A | 12/1985 |
| JP | 4526299 Y1 | 10/1970 |
| WO | 2010111008 A1 | 9/2010 |

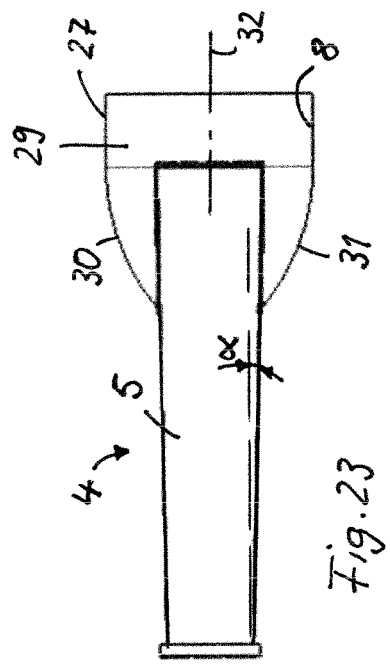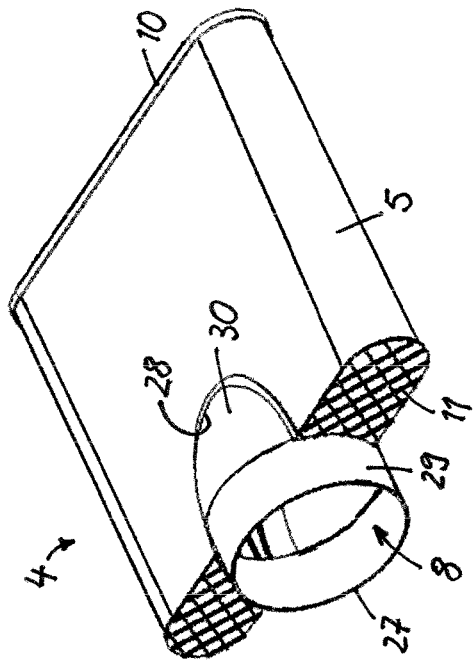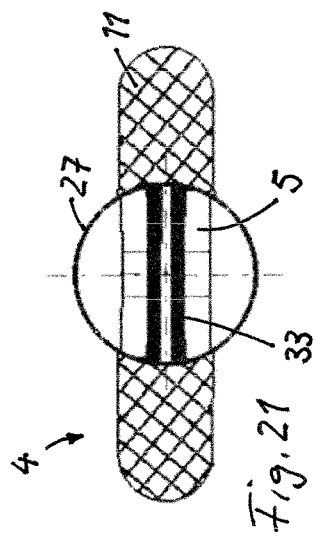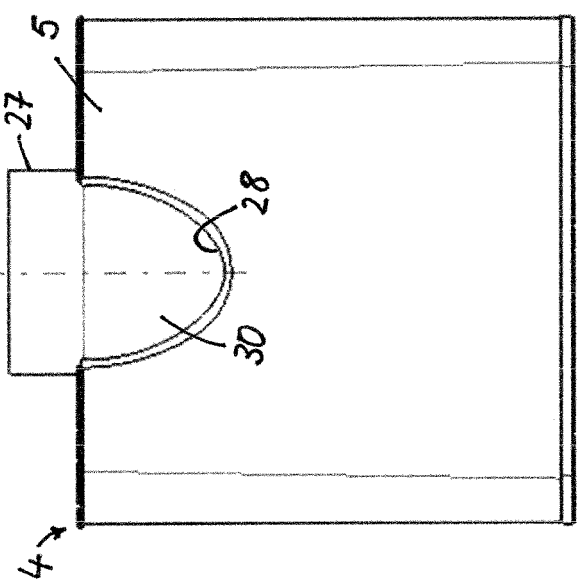

FILTER INSERT FOR A FILTER DEVICE

TECHNICAL FIELD

The invention relates to a filter insert for a filter device, particularly for a gas filter.

BACKGROUND OF THE INVENTION

In EP 2 152 385 B1, a gas filter with a filter insert is described which can be inserted into a filter housing and has a U-shaped filter element through which the fluid to be filtered flows radially from the outside to the inside. Disposed between the two legs of the U-shaped filter element is the clean space from which the filtered fluid is discharged via an outflow opening, said outflow opening being integrated into a cover panel on the free front sides of the legs.

Moreover, cylindrical filter elements are known which are flowed through radially from the outside to the inside and enclose an axial outflow space from which the fluid is discharged axially. Such cylindrical filter elements are sealed on the front sides by end plates, an outflow opening being disposed in an end plate through which the fluid is discharged axially into a secondary channel.

A cylindrical air filter element is described, for example, in WO 2010/111008 A1. The filtering means of the filter element is embodied as a zigzag-shaped folded filter that is arranged in the manner of a ring, the front sides being interconnected by means of a connecting clip. The connecting clip extends over an arc segment of about 30° and has an air-impermeable wall.

What is generally sought after in filter devices is high cleaning performance with geometric dimensions that are as small as possible.

SUMMARY OF THE INVENTION

It is the object of the invention to provide, using simple measures, a simply constructed filter insert with high cleaning performance and compact dimensions.

This object is achieved according to the invention with the features of the independent claim. The subclaims indicate expedient developments.

The invention relates to a filter insert in filter devices for filtering a fluid, particularly on gas filters, such as air filters for combustion engines, for example, with which the combustion air to be fed to the cylinders of the combustion engine is subjected to filtration. In principle, however, use for liquid filtration is also possible, for example for filtering oil or fuel in motor vehicles.

The filter device includes a filter housing with a receiving space disposed therein and a filter insert that can be inserted into the receiving space in the filter housing. The filter insert has a filter element made of a filter medium or filtering means, for example a filter paper, as well as a flow opening on the front side of the filter element for the fluid.

The flow opening is preferably embodied as an outflow opening on the front side of the filter element through which the cleaned fluid is discharged from the filter element after flowing through the filtering means. The outflow opening lies on the filtered side of the filter element and communicates in the installed position with corresponding openings or pipes or channels to discharge the cleaned fluid.

Optionally, the flow opening can also form an inflow opening through which the unfiltered fluid is fed to the filter element.

The filter element has at least one flattened portion in relation to the longitudinal axis of the flow opening that has a reduced radial thickness and extends immediately adjacent to the flow opening along the periphery of the flow opening. The filter element thus has a reduced thickness along a defined angular segment along the flow opening. Optionally, the thickness can be reduced to zero, so that a through hole is present in the filter element that also extends over a defined angular segment along the periphery of the flow opening.

The filter element has an elongate cross section and is U-shaped, for example, so that the interior distance in the filter element in a first direction transverse to the longitudinal axis of the flow opening is shorter than the interior distance in a second direction transverse to the longitudinal axis. The shortest interior distance in the filter element immediately adjacent to the flow opening—along a tangent to the outside diameter of the flow opening—is shorter than the inside diameter of the flow opening.

This embodiment has the advantage that, in relation to the outer dimensions of the filter element, a relatively large flow opening for conveying the filtered fluid is present, which is associated with reduced flow resistance on the filtered side of the filter element. The reduced flow resistance downstream from the filter element increases the cleaning efficiency, so that predefined requirements for a certain level of cleaning performance can be met even with smaller-sized filter elements.

According to another aspect of the invention, a housing nozzle which, when installed, preferably communicates with the filtered side of the filter element and serves to discharge the cleaned fluid, is arranged at the receiving space of the filter housing used to receive the filter insert. The diameter of the housing nozzle is at least 50%, preferably at least 75% of the height of the receiving space into which the filter insert is inserted. The housing nozzle and the flow opening of the inserted filter insert, which advantageously form the outflow opening, communicate with one another, particularly in such a way that the flow opening and the housing nozzle are arranged coaxially to one another when installed. The flow opening rests particularly directly against the housing nozzle of the filter housing.

In this case as well, the flow resistance of the filter insert and of the filter element is reduced as a result of the relatively large diameter of the housing nozzle. Another advantage of this embodiment is that relatively flat filter devices can be used without restricting the cleaning performance, for example filter housings in which the height of the receiving space is no more than half the width and/or length of the receiving space. The diameter of the housing nozzle can optionally reach the entire height or at least approximately the entire height of the receiving space. The diameter of the housing nozzle refers here to the clear inside diameter. Due to the thin-walled design of the housing nozzle, which is usually made of a plastic material, the outside diameter can also be used for assessing the geometries.

Both circular cross sections of the housing nozzle and non-round cross sections, such as oval-shaped cross sections, are worthy of consideration. In the case of non-round cross sections, the shortest diameter of the housing nozzle is at least 50% or 75% of the height of the receiving space for receiving the filter insert.

The filter element expediently encloses, at least partially, a clean space that is connected to the front-side flow opening on the filter element. For example, the filter element can have a U-shaped cross section, the two legs of the U-shaped cross section bordering on the intermediate clean space. The flow opening expediently does not rest against the free front sides of the legs, but rather against the longitudinal sides of the legs, whereby the fluid flows out of the clean space transverse to the longitudinal extension of the legs. The exterior distance from leg to leg defines the height of the filter element that must be adapted to the height of the receiving space. The outside diameter of the flow opening can optionally be less than the height of the filter element. In this case, the filter element does not enclose the outer periphery of the flow opening; rather, a through hole exists, so that an angular segment over the outer periphery of the flow opening is free of filtering means of the filter element.

In the case of a U-shaped design of the filter element, the lateral legs can be arranged parallel to one another. However, an angular arrangement of straight legs is also possible, or, according to another embodiment, a convexly outwardly curved oval design of the legs.

It can be expedient to equip the filter insert with an flow pipe against which the filter element rests and around which the filter element engages at least partially. The flow pipe, which is located on the filtered side of the filter element, has at least one flow opening disposed in the wall through which the fluid on the filtered side of the filter element can flow into the flow pipe and be discharged axially along the flow pipe. The flow opening is located on the front side of the outflow pipe, two designs that are worthy of consideration are those in which the flow opening is embodied in a component separate from the flow pipe, for example an outflow ring which, however, is placed onto or inserted into the flow pipe, or also those in which the flow opening forms the front-side opening of the flow pipe. Expediently, the flow pipe has at least approximately the same length as the filter element, whereby it is possible for the cleaned fluid to pass uniformly over the length of the filter element into the flow pipe.

The flow pipe preferably forms the outflow pipe.

According to another expedient embodiment, a plug-in part is plugged into the flow pipe that has a shorter length than the flow pipe and influences the acoustic characteristics, optionally also the flow behavior, of the filter device. The plug-in part is expediently plugged from outside into the flow pipe via the flow opening. The plug-in part can have a tulip-shaped extension on a front side, preferable on the front side projecting into the flow pipe, in order to influence the acoustic and/or the flow characteristics in a desirable manner. A constriction is located in the plug-in part immediately before the tulip-shaped widening that brings about a nozzle effect with the subsequent widening.

The filter insert can be provided with a hollow base that expediently extends through the filter element and is used for the connection to a housing-side fastening element. The housing-side fastening element can project into the hollow base, for example, in order to achieve a fixation of the filter insert in the filter housing. It is also possible to introduce a fixing part, for example a screw, into the hollow base and to connect the hollow base to the filter housing by means of the screw. The hollow base advantageously extends through the clean space bordered by the filter element or bordered at least partially by the filter element. To prevent leakage flows, the flow channel is separated in a flow-tight manner from the clean space. The hollow base is embodied as a plastic component, for example, that is at least approximately hollow base, optionally with an elongate cross section, the outer walls of the hollow base being immediately adjacent to the clean space and the interior space of the hollow base serving to receive the fastening element or fixing part. The hollow base expediently projects completely through the filter element. The interior space in the hollow base can be continuous, or a design can optionally be considered in which the interior space of the hollow base is not continuous, but rather is interrupted by an interposed wall. Insofar as a flow pipe is provided in the filter insert, the hollow base can be integrated into the flow pipe and project through same. In this case as well, the interior space of the hollow base is separated from the hollow base outer wall in a flow-tight manner in order to prevent undesired leakage flows.

Different design variants of the filter element are possible with respect to the flow opening. For example, the filter element can engage around the flow opening over an angular segment of at least 180°, e.g., over an angular segment of 270°, optionally also greater than 300°, but less than 360°, so that an angular segment on the outer perimeter of the flow opening is free of filtering means. However, embodiments are also possible in which the flow opening is completely enclosed by filtering means of the filter element, in which case the filter element has a flattened portion over at least one angular segment and is thus provided with a smaller radial thickness in order to enable large diameters of the flow opening in relation to the height of the filter element.

According to another embodiment, the filter element engages around the flow opening over an angular range of no more than 180°, particularly no more than 90°, which opens up the possibility of having several mutually independent filter elements border the flow opening, in which case a common flow opening is used by the different filter elements to discharge the cleaned fluid. For instance, in the case of a U-shaped basic cross section of the filter element, a filter insert with two diagonally opposing filter elements can be arranged at the flow opening and, optionally, a central flow pipe. Each filter element borders on the flow opening or the flow pipe via an angular segment of less than 180°, whereby, in the case of a diagonally opposing arrangement of the filter elements, a respective angular segment on the periphery of the flow opening or flow pipe remains free of filtering means. According to another expedient embodiment, the opposing filter elements are interconnected via a flattened connecting section that rests directly against the outer periphery of the flow opening or flow pipe but whose thickness is reduced.

According to another expedient embodiment that relates to a filter element that encloses a clean space at least partially, the interior spacing of the filtering means of the filter element is shorter than the inside diameter of the flow opening. In this regard, designs that are worthy of consideration include those in which the inside of the filtering means rests against the outer periphery of the flow opening or an extension of the inner side is located outside of the inside diameter of the flow opening, as well as those in which the extension of the inside cuts the clear inside diameter of the flow opening.

According to another expedient embodiment, the filter element is embodied as a folded filter with filter medium folded in a zigzag pattern. The folded filter can assume different basic geometries; for example, it can have a U-shaped cross section as described above.

The filter insert, which can be inserted into the receiving space in the filter housing, has at least one filter element and one flow opening, particularly an outflow opening, which is embodied as an outflow ring, for example. Optionally, filter inserts with at least two filter elements on a common flow opening can also be considered. Moreover, it is possible to insert only one filter insert or, optionally, even several filter inserts into the receiving space in the filter housing, for example two mutually adjacent filter inserts, a flow opening being associated with each filter insert and communicating respectively with a housing nozzle on the filter housing.

According to another advantageous embodiment, the filter element is provided on its filtered side with a secondary outflow opening that is arranged at a distance to the first flow opening. The secondary outflow opening enables the use of the cleaned fluid in an additional unit. In the case of a U-shaped embodiment of the filter element, the secondary outflow opening, with which a secondary nozzle in the filter housing is expediently associated, can be arranged both on the same side as the primary outflow opening and on the opposite side. The outflow direction through the primary outflow opening and the secondary outflow opening expediently occurs in parallel. If two or more filter elements are associated with a filter insert, the embodiments that merit consideration are both those in which only one filter element is provided with a secondary outflow opening and those in which several or all filter elements are each equipped with at least one outflow opening.

According to yet another design variant, a plurality of air-conducting elements are located on the outer wall of the flow pipe, particularly of the outflow pipe, that project into the filter element bordering the flow pipe and influence the airflow through the filter element. In particular, the flow-conducting elements ensure that the cleaned gas is guided on the interior of the filter element in an improved manner to the flow openings in the wall of the flow pipe. As described previously, the filter element is U-shaped, for example, and at least approximately U-shaped [sic], the open U-side extending toward the wall of the outflow pipe. A U-shaped filter element can be arranged on diametrically opposed sides of the flow pipe into whose interior flow-conducting elements respectively project.

Another aspect of the invention relates to a filter insert for a filter device, particularly for a gas filter, such as an air filter for a combustion engine, for example, the filter insert having a filter element and a flow opening on a front side. According to an advantageous embodiment, the filter element has an elongate cross section. Moreover, a recess that is open at the edge is disposed in the filter element in the region of the front side into which a connecting piece is inserted that has the flow opening. This embodiment has the advantage that the connecting piece can be integrated at least partially into the filter element within the open recess, whereby the filter insert with filter element and flow opening can be embodied so as to have a relatively short installed length.

Moreover, it is advantageous that flow guidance is possible on sides of the filter element both in the axial direction and orthogonally to the axial direction in the region of the recess on the front side. This enlarges the overall flow cross section, particularly for the discharging of the fluid from the filter element, and improves the flow conditions, particularly reducing the flow resistance.

The flow opening is preferably an outflow opening that communicates with the inner-lying filtered side of the filter element and through which the cleaned fluid is discharged axially. In one design variant, the flow opening forms an inflow opening through which the unfiltered fluid is conveyed into the interior of the filter element.

According to an expedient embodiment, the connecting piece has two tabs covering the recess. The tabs are located on the upper side and lower side of the filter element, each in the region of the recess, and each tab projects into the recess on the upper side and lower side, respectively, of the filter element. The tabs are advantageously connected in a flow-tight manner to the filter element in order to prevent airflow leakage.

According to an advantageous embodiment, the tabs can be integrally formed with a flow ring that forms the flow opening and is seated on the front side of the filter element. The flow ring particularly projects axially over the front side of the filter element.

At least one tab, and advantageously both tabs, can be arched convexly outward, whereby an additional axial flow path is created on the inside for the fluid in the region of the recess of the filter element. In the case of an embodiment of the flow opening as an outflow opening, the filtered fluid can thus flow upward and downward from the interior of the filter element axially and also orthogonally to the axial direction over the convex tab or tabs, a deflection of the flow occurring on the inner wall of the tab or tabs in the axial direction or in the direction of the flow opening. Overall, this enables the fluid to flow over a larger surface area.

The tabs advantageously have the same basic cross section as the recess. It can be expedient for the tabs to have an at least slightly larger base face than the recess, in which case the edge region of the tabs rests on the outside of the filter element adjacent to the recess and is connected particularly in a flow-tight manner to the outside of the filter element.

According to another expedient embodiment, the recess is embodied so as to be partially circular, particularly semicircular. Non-circular embodiments of the recess also merit consideration, however, preferably rounded embodiments such as partially elliptical or partially oval-shaped cross-sectional shapes. Moreover, angled recesses are also possible, for example rectangular recesses.

According to another expedient embodiment, the front sides each enclose a different-sized front side on the two diametrically opposed sides of the filter element. According to an advantageous embodiment, this is achieved in that the transition between the front sides are embodied so as to be conical. The cone angle—with respect to the longitudinal axis of the filter element—is preferably no more than 10°, particularly no more than 5°, for example no more than 2° or no more than 1°. However, a nonlinear transition from front side to front side is also possible, for example in the form of a concave longitudinal cross section. Non-continuous transitions with jumps or steps are also possible.

According to another expedient embodiment, the reduction of the enclosed cross-sectional surface is achieved, at least in the case of an elongate cross-sectional shape of the filter element when seen over the length, through convergence of the larger exteriors of the filter element. Additionally or alternatively, however, the narrow sides of the filter element, when seen over the length, can also have a changing distance to one another.

According to another expedient embodiment, the filter element can completely enclose an interior space and is particularly provided with an elongate cross section in which the ratio of the long sides to the narrow sides—when seen in a projection onto a horizontal or vertical plane—is at least 2:1, at least 3:1, or at least 4:1, for example.

BRIEF DESCRIPTION OF THE DRAWINGS

Additional advantages and expedient embodiments can be derived from the other claims, the description of the figures and the drawings.

FIG. 21 shows a front view of the filter insert according to FIG. 20, FIG. 22 shows a top view of the filter insert in the assembled state, FIG. 23 shows a side view of the filter insert, FIG. 24 shows a perspective view of the filter insert in the assembled state.

In the figures, similar components are designated by the same reference symbols.

DETAILED DESCRIPTION

Figure 1:
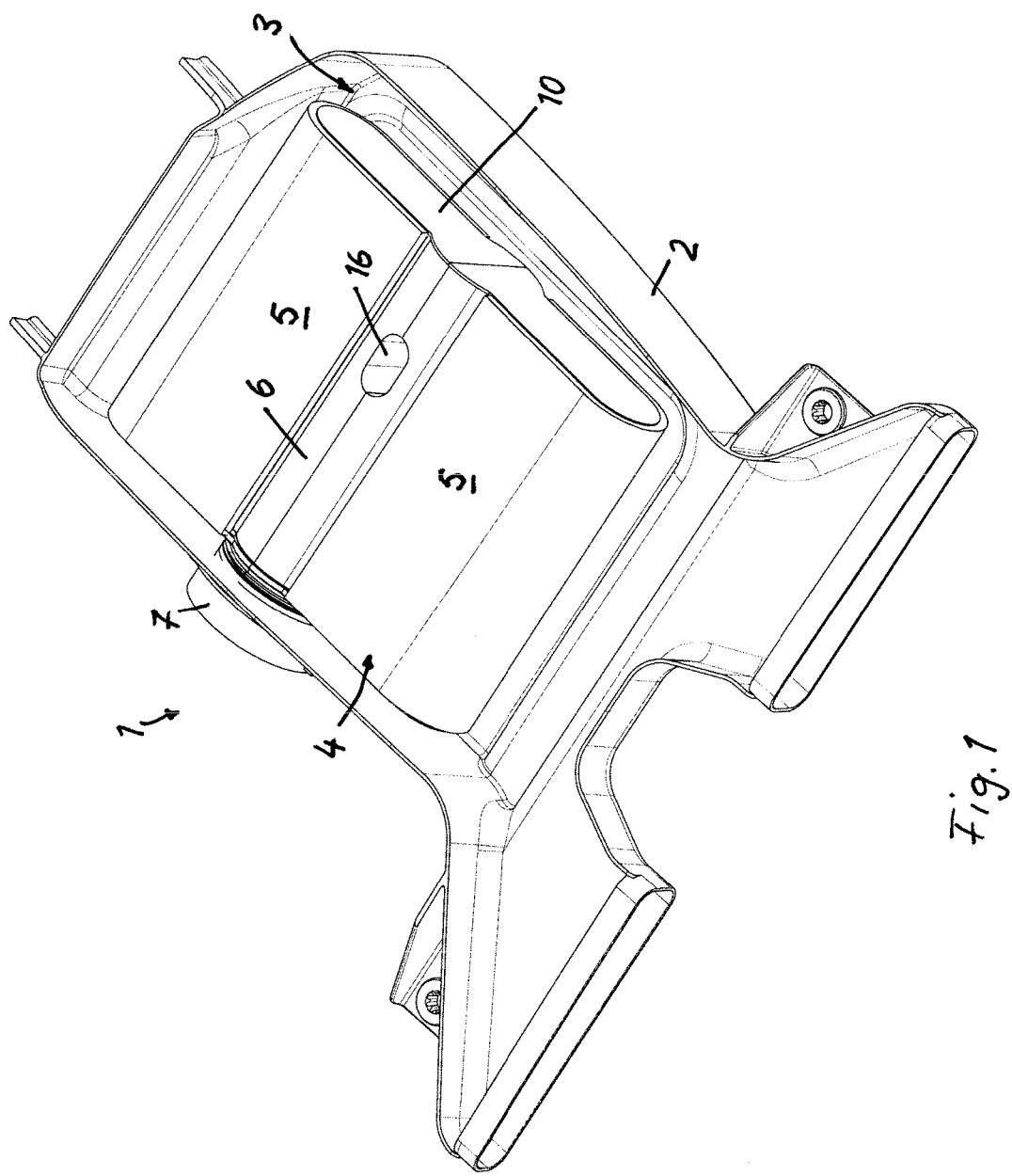
FIG. 1 shows a perspective view of a filter device with a filter insert in a receiving space of a filter housing, the filter insert having two diagonally opposing filter elements with a U-shaped cross section arranged on an outflow pipe, and the outflow pipe being connected to a housing nozzle on the filter housing.
Figure 2:
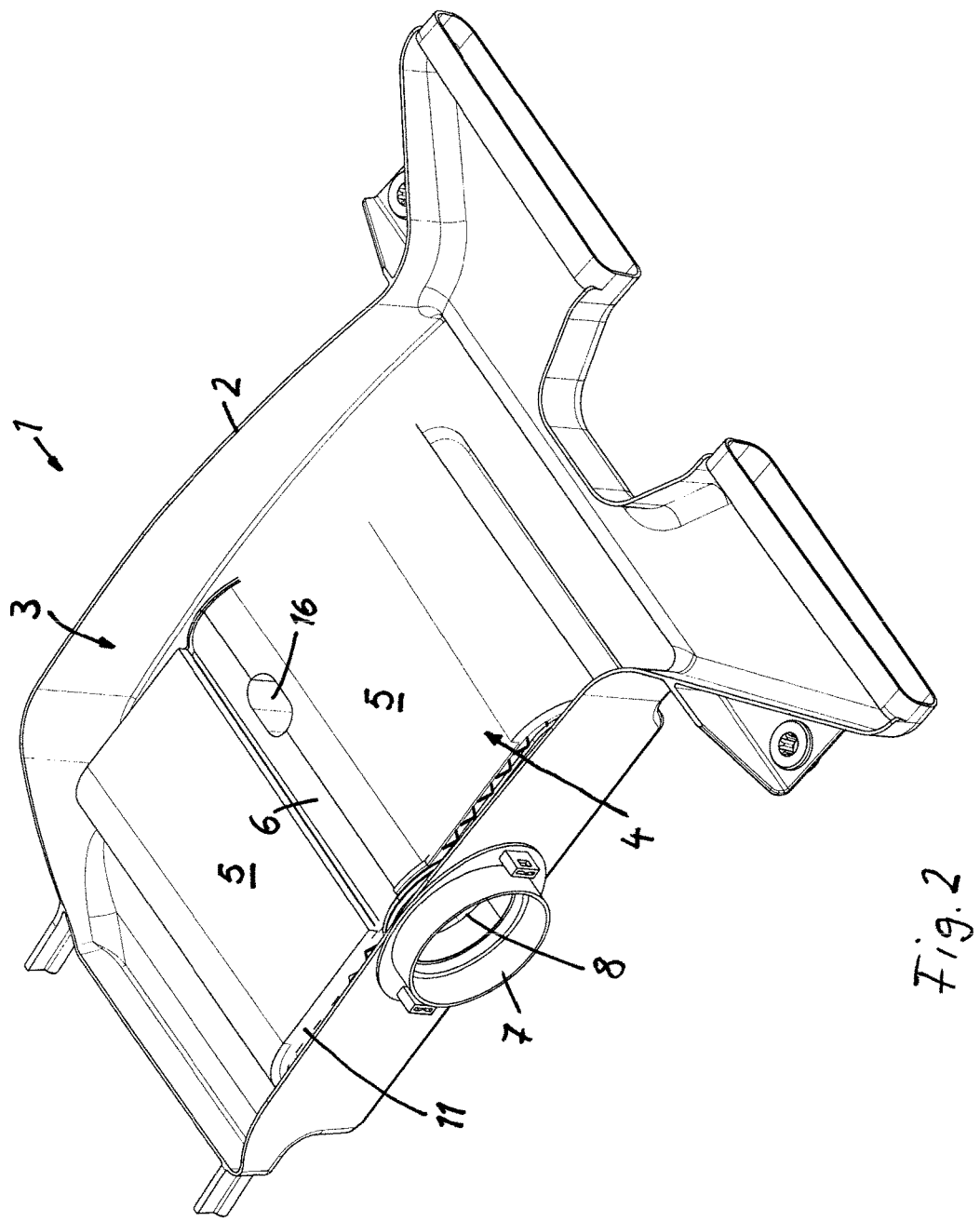
FIG. 2 shows the filter device according to FIG. 1 from another perspective.
Figure 4:
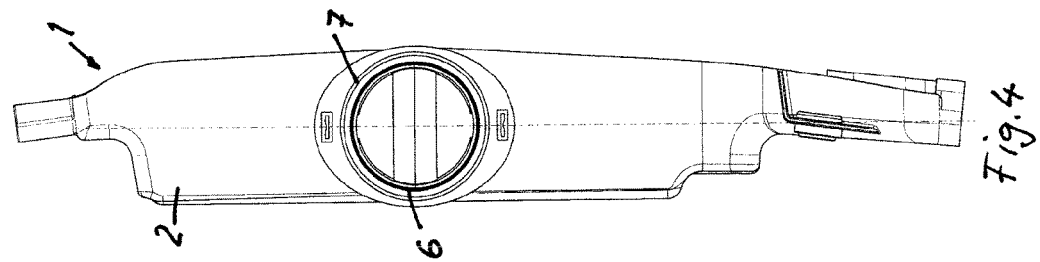
FIG. 4 shows a side view of the filter device with a representation of the housing nozzle for discharging the cleaned fluid.

FIGS. 1 and 2 show a perspective view of a filter device 1, which is embodied as an air filter for a combustion engine and has, in a receiving space 3 in a filter housing 2, a filter insert 4 for filtering the conveyed combustion air. The filter insert forms a structural unit and includes two filter elements 5 and an outflow pipe 6. The two filter elements 5 are arranged on diagonally opposing sides of the outflow pipe 6 and each have an approximately U-shaped cross section. Optionally, V-shaped cross sections of the filter elements can also be considered. The filter elements 5 are each flowed through radially from the outside to the inside—in the direction of the outflow pipe 6—by the fluid to be filtered. Flow openings are disposed in the wall of the outflow pipe 6 that are connected to the filtered side of the filter elements 5, whereby the fluid travels after filtration via the flow openings into the outflow pipe 6 and is discharged axially via the outflow pipe 6.

One or more flow-conducting devices can be arranged in the outflow pipe 6 and/or in the filter elements 5 to guide the fluid.

A housing nozzle 7 is arranged on the outer wall of the filter housing 2 that includes a recess in the housing wall and to which the outflow pipe 6 is connected. The front-side opening of the outflow pipe 6 forms the outflow opening 8, which rests directly against the housing nozzle 7. A channel or pipe can be connected on the side of the housing nozzle 7 opposite the outflow pipe to discharge the cleaned fluid. In the embodiment as an air filter, the outflow pipe 6 can, as a component of the filter insert 4 and of the housing nozzle, form a part of the suction conduit through which the cylinders of the combustion engine are supplied with fresh air.

Figure 3:
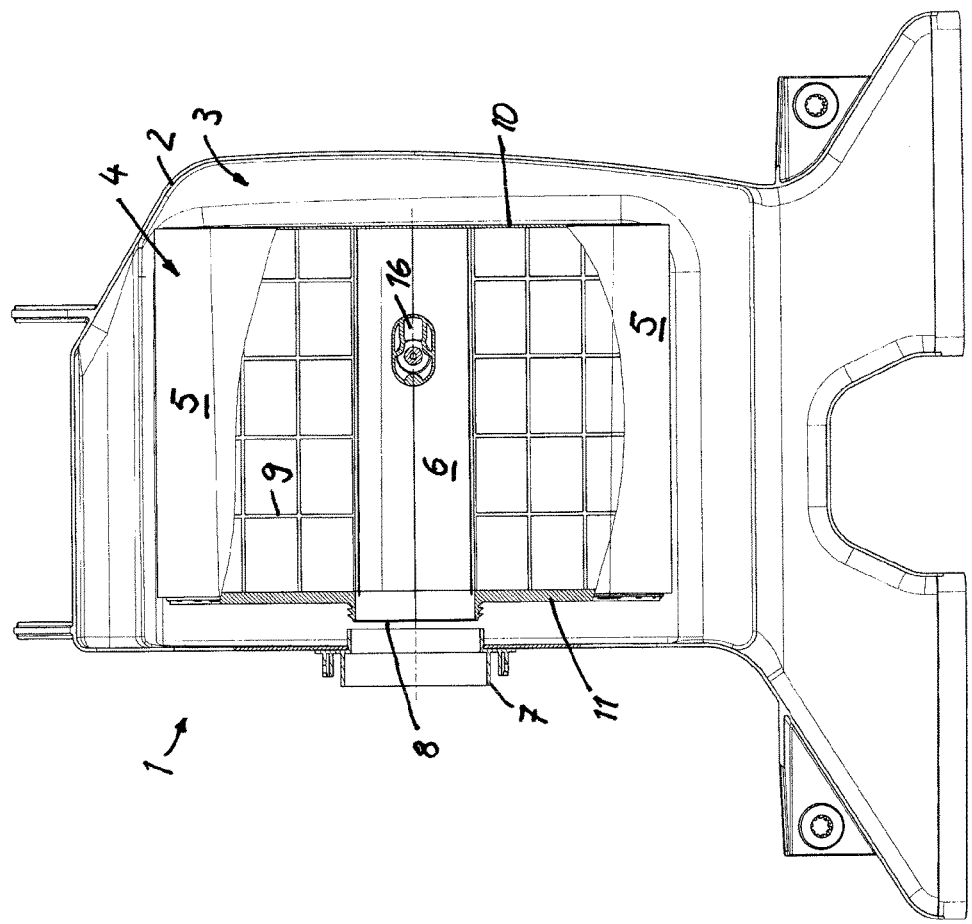
FIG. 3 shows a partially sectional top view of the filter device.

As can be seen particularly from FIG. 3, the filter element 5 has a supporting frame 9 that supports the filtering means or medium through which the fluid to be filtered flows. The filter element 5 has an approximate U-shape, the free front sides of the legs of the U-shape resting against the lateral surface of the outflow pipe 6. Accordingly, the rounded U-shape lies on the side facing away from the outflow pipe 6.

The legs of each U-shaped filter element 5 engage around an intermediate clean space, which communicates via the flow openings in the wall of the outflow pipe 6 with the interior of the outflow pipe. On the front side, the filter elements 5 and thus the interposed clean space is sealed by end plates 10 and 11. On the side opposite the outflow opening 8, the end plate 10 additionally seals the rear opening of the outflow pipe 6 as well.

The diameter of the outflow pipe 6 and of the outflow opening 8, which corresponds to the clear diameter of the outflow pipe on its outflow side, is approximately the same size as the height of the filter element 5. The filter elements 5 do not enclose the outflow pipe 6 completely, but rather leave two angular segments along the periphery of the outflow pipe 6 free. The free front sides of the U-shaped filter elements 5 rest against the outer wall of the outflow pipe 6, an angular segment of less than 180°, for example approximately 90°, on the outer periphery of the outflow pipe 6 being covered by each filter element 5.

The height of the filter insert 4 is significantly shorter than the width or length of the filter insert. The height is particularly no more than half as large as the width and/or the length of the filter insert. The same applies to the dimensions of the receiving space 3 in the filter housing 2 for receiving the filter insert 4.

Figure 5:
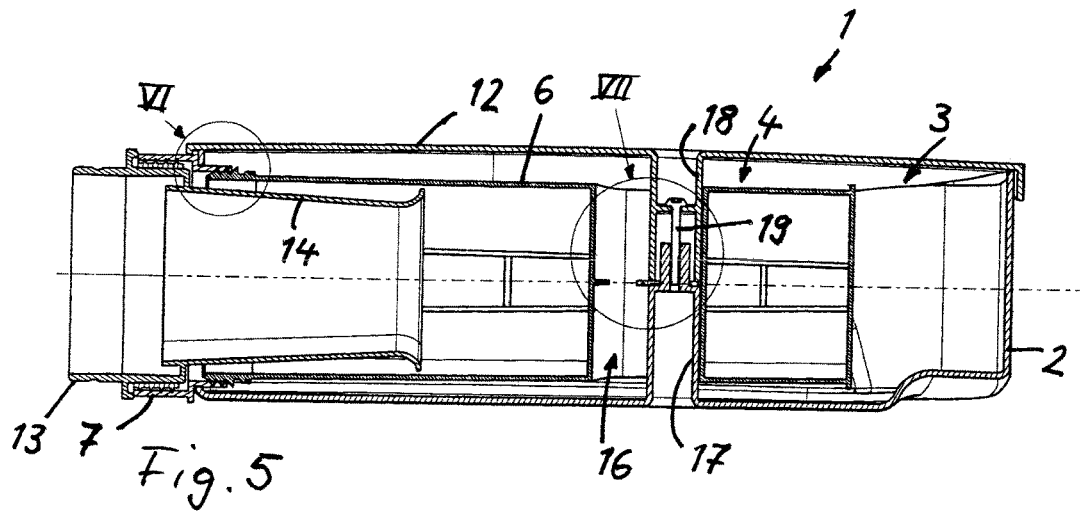
FIG. 5 shows a section through the filter device.
Figure 6:
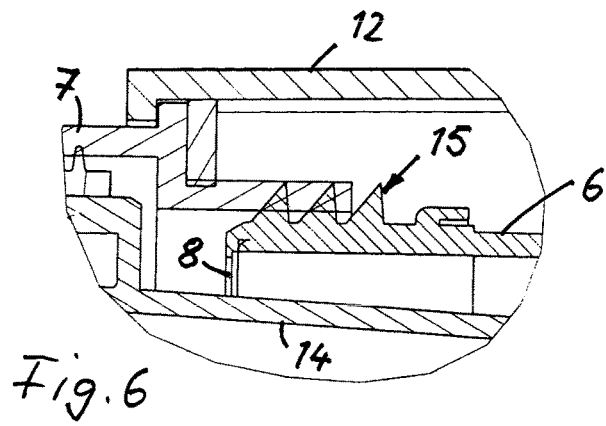
FIG. 6 shows an enlarged representation of detail VI from FIG. 5.
Figure 7:
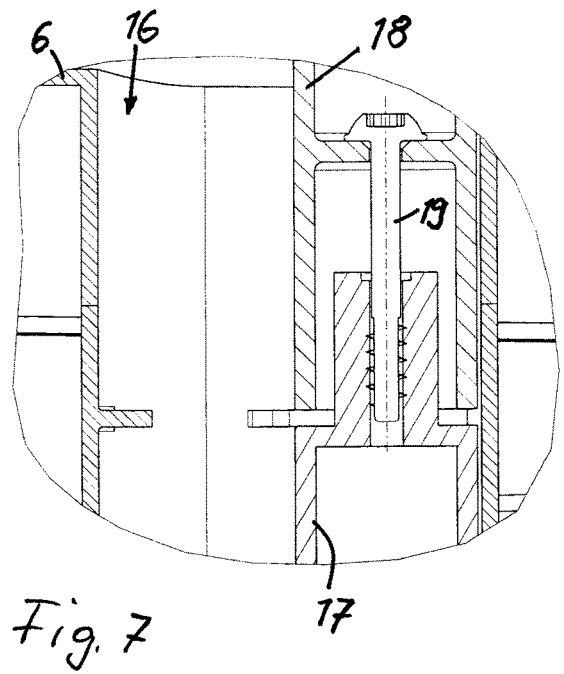
FIG. 7 shows an enlarged representation of detail VII from FIG. 5.

As can be seen in the sectional representation according to FIG. 5 and from the detailed illustrations according to FIGS. 6 and 7, the receiving space 3 in the filter housing 2 is to be sealed by a detachable housing cover 12. A conduit 13 is connected to the housing nozzle 7, which is plugged into a recess in the filter housing 2, through which the cleaned fluid is discharged. Via the outflow opening 8 that forms the front side of the outflow pipe 6, a plug-in part 14 is plugged into the outflow pipe 6 whose length is less than the length of the outflow pipe 6. The conduit 13 is embodied as a nozzle that is integrally formed with the plug-in part 14, the nozzle 14 projecting only slightly beyond the outflow opening 8 of the outflow pipe 6 and having an overall smaller diameter than the conduit 13. The plug-in part 14 has a diameter that changes over its axial length, initially decreasing continuously starting from the front-side region lying immediately outside of the outflow opening and widening in the manner of a tulip on the opposing front side that projects into the outflow pipe 6. By means of the plug-in part 14, the noise characteristics and possibly the flow characteristics as well can be influenced.

As can be seen in the enlarged illustration according to FIG. 6, a knurl or groove portion 15 can be arranged on the front-side end region of the outflow pipe 6 on the outside with which the outflow pipe 6 is inserted into the larger-sized housing nozzle 7, whereby a sufficiently robust and flow-tight connection is achieved between the outflow side of the outflow pipe 6 and the housing nozzle 7. A corresponding knurl or groove portion can also be arranged on the outer lateral surface of the nozzle-like conduit 13 that is integrally formed with the plug-in part 14, the knurl or groove portion being engaged around by another portion of the housing nozzle 7. This knurl or groove portion can optionally also be embodied as a separate component that is arranged between the outer lateral surface of the nozzle-like conduit 13 and the interior of the housing nozzle 7.

A hollow base 16 is introduced into the outflow pipe 6 through which the outflow pipe 6 passes completely in the radial direction. The hollow base has an elongate, substantially oval-shaped cross section and is used to secure the filter insert 4 in the filter housing 2. The hollow base 16 has a circumferential wall that separates the interior of the hollow base from the interior of the outflow pipe 6 in a flow-tight manner. The interior of the hollow base 16 serves to receive the housing-side fastening elements 17, 18 (FIGS. 5, 7), which are integrally formed with the filter housing 2 and the housing cover 12 and extend orthogonally to the longitudinal axis of the outflow pipe 6 and project into the interior of the hollow base 16. The fastening elements 17, 18 each form a dome that has a smaller cross section than the inside of the hollow base 16, thus enabling a relative axial displacement of the outflow pipe 6 and filter insert 4 along the longitudinal axis of the outflow pipe. The dome-like fastening elements 17, 18 are interconnected via a screw 19 that is inserted via the housing cover 12.

For assembly, the filter insert 4 is first placed into the receiving space 3 of the filter housing 2, the dome-like fastening element 17, which is integrally formed with the filter housing 2 and rises from the bottom of the receiving space, projecting into the interior of the hollow base 16 in the outflow pipe 6. The outflow pipe 6 is then displaced along its longitudinal axis such that the front-side portion of the outflow pipe 6 is pushed with the knurl 15 or groove portion into the housing nozzle 7, which is arranged on the filter housing 2. After that, the plug-in part 13, 14 can be inserted axially via the outflow opening 8 into the outflow pipe 6. Finally, the housing cover 12 is put in place and the dome-like, downwardly projecting fastening element 18 on the housing cover 12 is inserted into the interior of the hollow base 16 in the outflow pipe 6 until the dome-like fastening elements 17, 18 are arranged coaxially to one another and can be securely interconnected by means of the screw 19.

Figure 8:
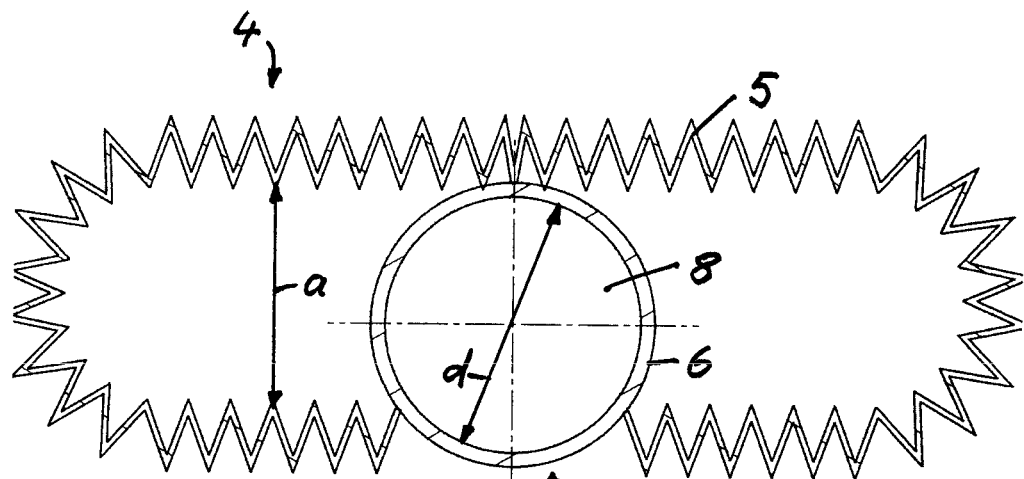
FIG. 8 shows a sectional, schematic representation of a filter insert with a filter element embodied as a folded filter that engages partially around an outflow opening.
Figure 9:
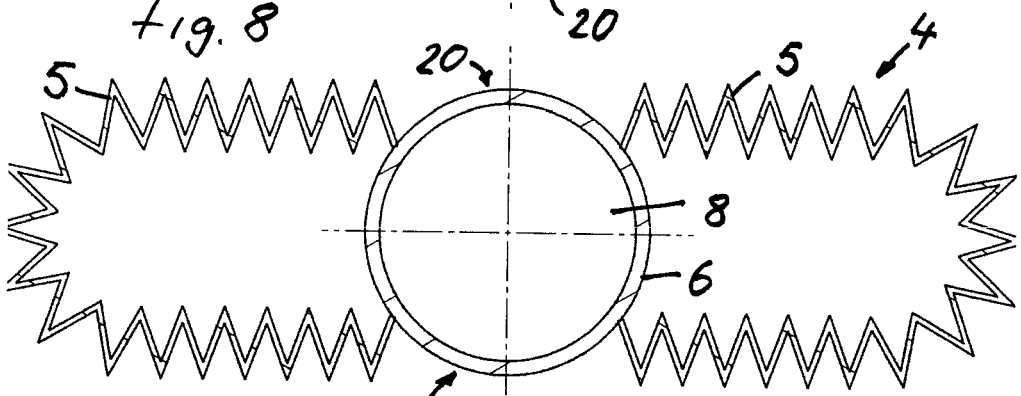
FIG. 9 shows another exemplary embodiment with two separate filter elements, each of which borders on the outflow opening.
Figure 10:
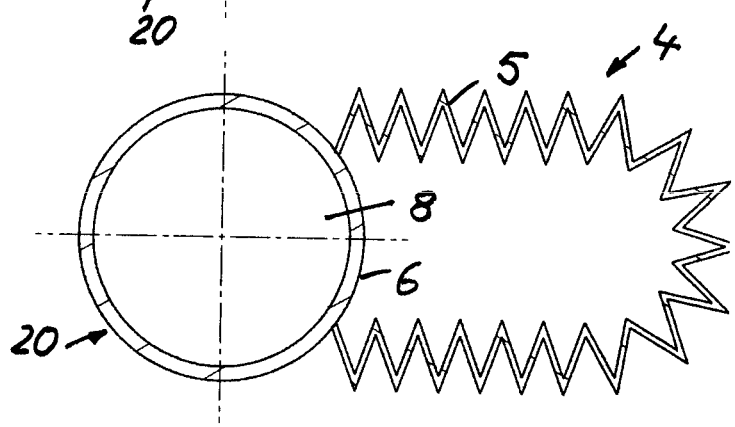
FIG. 10 shows another exemplary embodiment with a single filter element at the outflow opening.

FIGS. 8 to 10 show schematic representations of various exemplary embodiments for filter inserts 4 with filter elements 5 and an outflow opening 8. The outflow opening is located on the front side of the outflow pipe 6, whose inside diameter d, as can be seen in FIG. 8, is larger than the interior distance a between the inner-lying tips of the filter element 5 embodied as a folded filter. The filter element 5 is U-shaped, so that the tips inside of them enclose a clean space whose clear height corresponds to the interior distance a. Insofar as the outflow pipe 6 does not have a round but an oval-shaped cross section, the relationships refer to the radial inner extension of the outflow pipe with respect to the height in the direction of the interior distance a of the filter element 5.

According to one advantageous embodiment, the radial extension d of the outflow pipe 6 is approximately equal to or shorter than the housing height with respect to the vertical direction or the direction of the interior distance a of the filter element 5.

The filter element 5 has two U-shaped portions that are interconnected on one side of the outflow pipe 6, whereas a through hole 20 is disposed on the opposite side on the circumferential side of the outflow pipe 6. The through hole 20 extends in the circumferential direction of the outflow pipe 6 over an angular segment of approximately 90°. The free ends of the filter element 5 rest against opposing sides of the through hole on the lateral surface of the outflow pipe 6. In the continuous portion, which is at the top in FIG. 8, the inner-lying tips of the filter element 5 contact the lateral surface of the outflow pipe 6, whereas, as a result of the shorter interior distance a, the tips lying inside of them project farther inward on the opposite side of the filter element.

In the exemplary embodiment according to FIG. 9, the filter insert 4 has two individual, mutually separate filter elements 5, each of which has a U-shaped basic cross section and is embodied as a folded filter. The free front sides of the legs of the U-shaped filter elements rest against the lateral surface of the outflow pipe 6 and engage around a respective angular segment that covers about 90°. The two filter elements 5 are arranged diagonally across from one another, whereby, on the periphery of the outflow pipe 6 between the two filter elements 5, a through hole 20 is formed above and below that also extends respectively over an angular segment of about 90°. The parallel legs in the U-shaped basic cross section can also be aligned at a certain angle in relation to one another, thus resulting in a V-shaped arrangement or a combined U- and V-shaped arrangement.

In the exemplary embodiment according to FIG. 10, the filter insert 4 includes only one single U-shaped filter element 5, which is embodied as a folded filter and whose free front sides rest against the outer periphery of the outflow pipe 6. The filter element 5 engages around an about 90° angular segment on the periphery of the outflow pipe 6. Accordingly, the through hole 20 covers an angular segment of about 270°.

Figure 11:
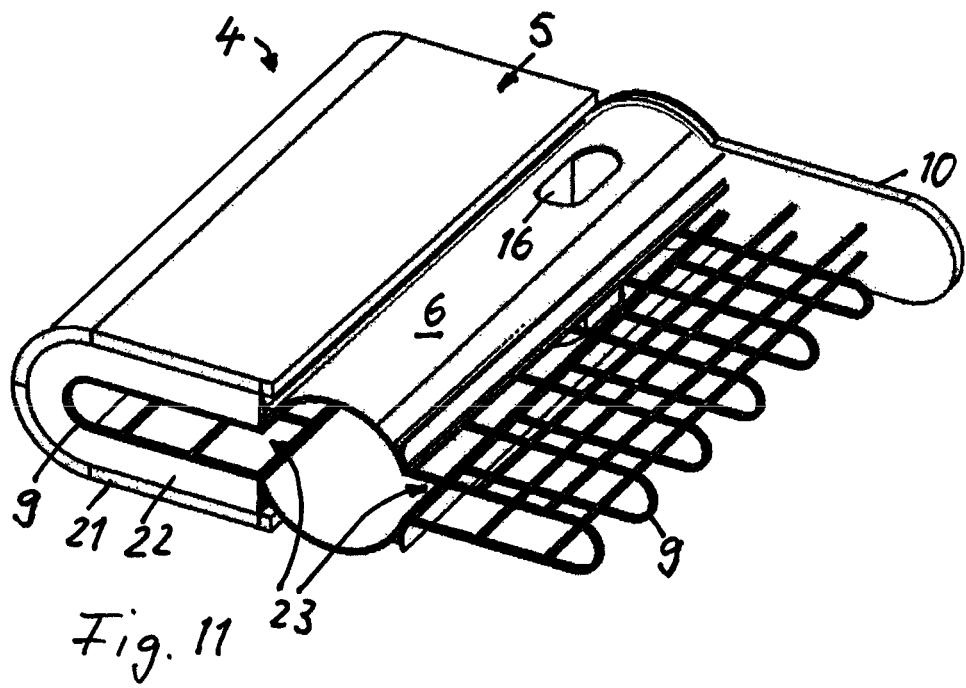
FIG. 11 shows a perspective view of a filter insert whose basic structure corresponds to that of FIG. 9, in a partially installed state.
Figure 12:
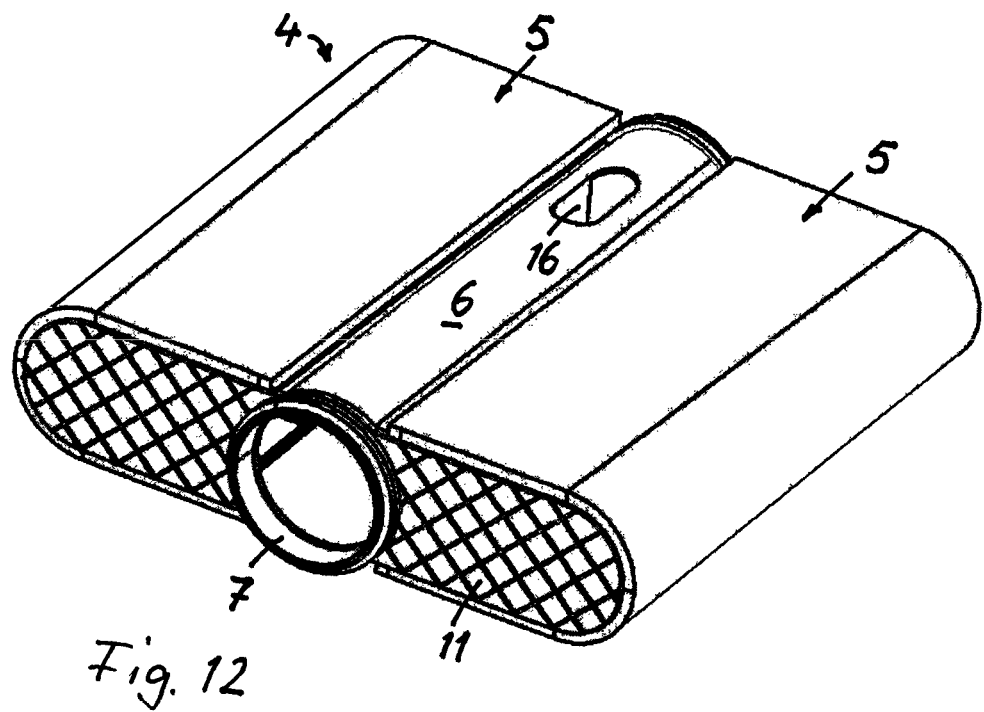
FIG. 12 shows the filter insert according to FIG. 11 in the completely installed state.

Another exemplary embodiment of a filter insert 4 is shown in FIGS. 11 and 12. The filter insert 4 includes a central outflow pipe 6 to which a supporting frame 9 is connected, a supporting frame 9 being provided for a respective filter element 5 on diagonally opposing sides of the outflow pipe 6. A hollow base 16 is introduced for assembly-related purposes into the outflow pipe 6 in the aforedescribed manner which passes through the outflow pipe 6 orthogonally to its longitudinal axis. Each filter element 5 optionally consists of an outer filtering or covering layer 21 and, in all cases, of an inner-lying filtering means 22, which rests directly on the U-shaped supporting frame 9, so that the filter element 5 with the two layers 21, 22 also has an overall U-shaped cross section. Flow openings 23 are disposed in the wall of the outflow pipe 6 through which the clean space between the legs of the U-shape of the filter element 5 is connected to the interior of the outflow pipe 6.

At the axial ends, the filter elements 5 are covered by end plates 10 and 11, respectively.

Figure 13:
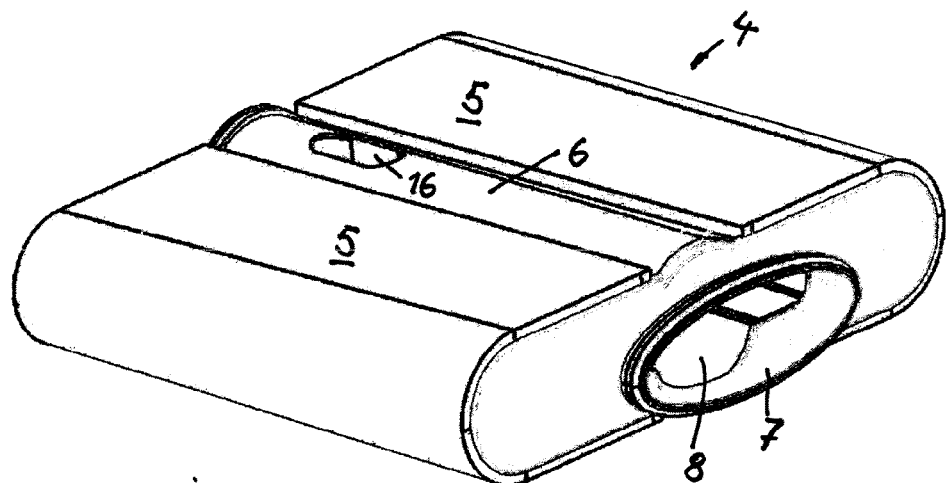
FIG. 13 shows a design variant of a filter insert with an oval-shaped outflow opening.

In the exemplary embodiment according to FIG. 13, the filter insert 4 also has two filter elements 5 arranged on diagonally opposing sides of the outflow pipe 6 and U-shaped in cross section. The housing nozzle 7 has an oval-shaped cross section; the outflow pipe 6 and the front-side outflow opening 8 are also expediently provided with an oval-shaped cross section. In the preceding exemplary embodiments, on the other hand, the outflow pipe, outflow opening and housing nozzle each have a round cross section.

Figure 14:
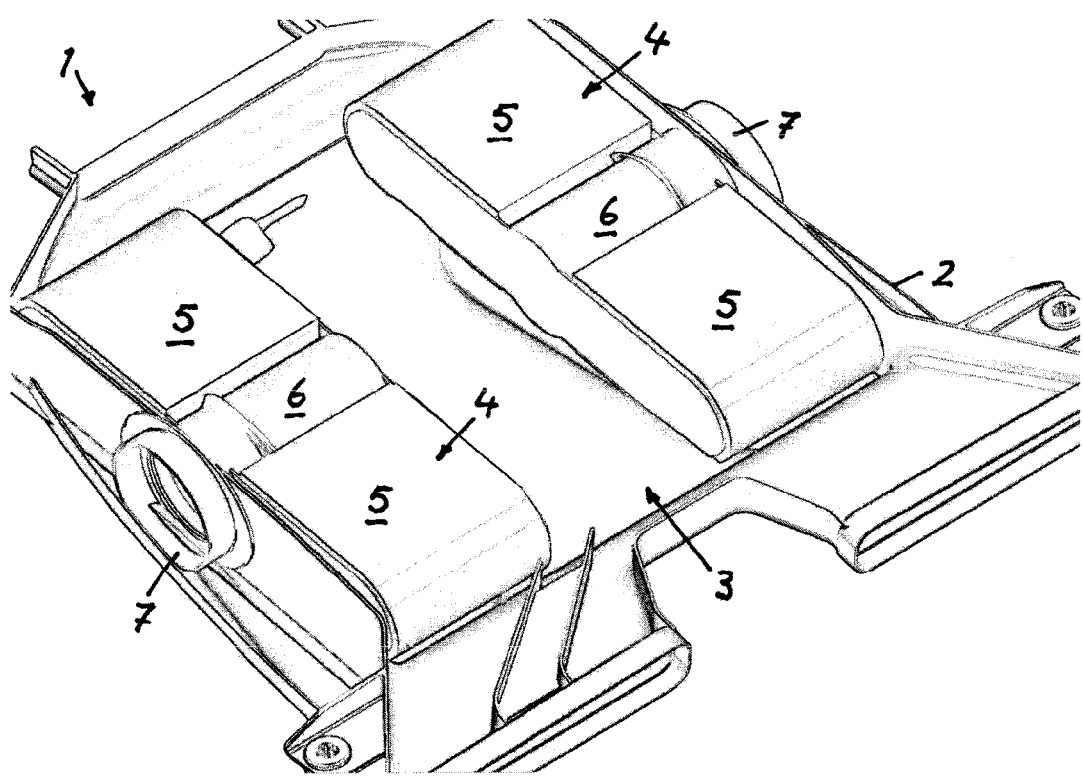
FIG. 14 shows a design variant of a filter device with two separate filter inserts in a receiving space of the filter housing.
Figure 15:
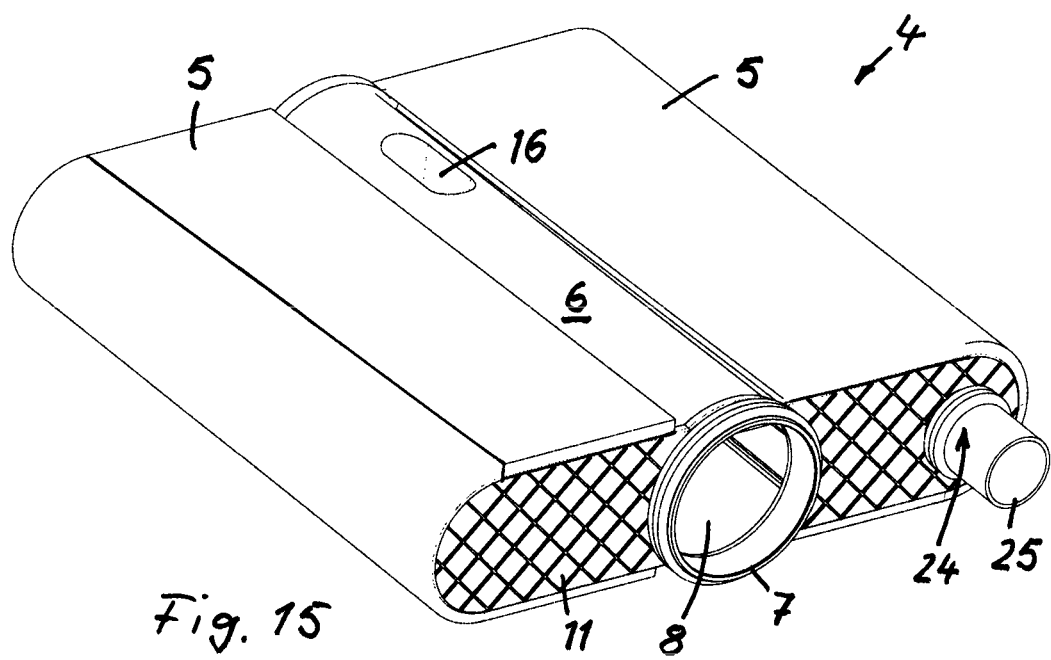
FIG. 15 shows a design variant of a filter insert with additional secondary outflow opening arranged on the filtered side of the filter element with a parallel offset to the central outflow opening.
Figure 16:
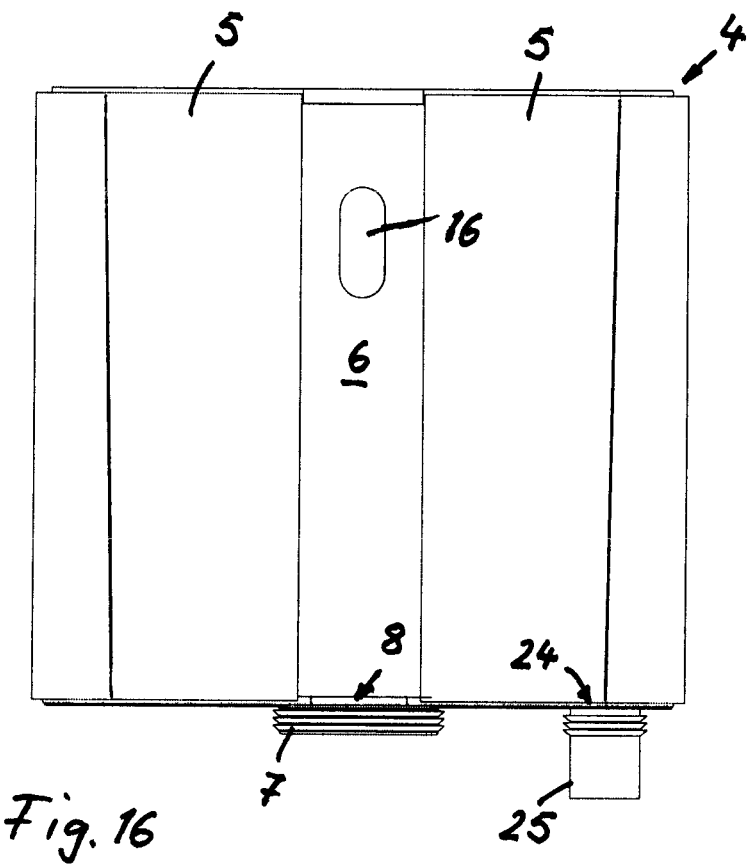
FIG. 16 shows a top view of the filter insert from FIG. 15.
Figure 17:
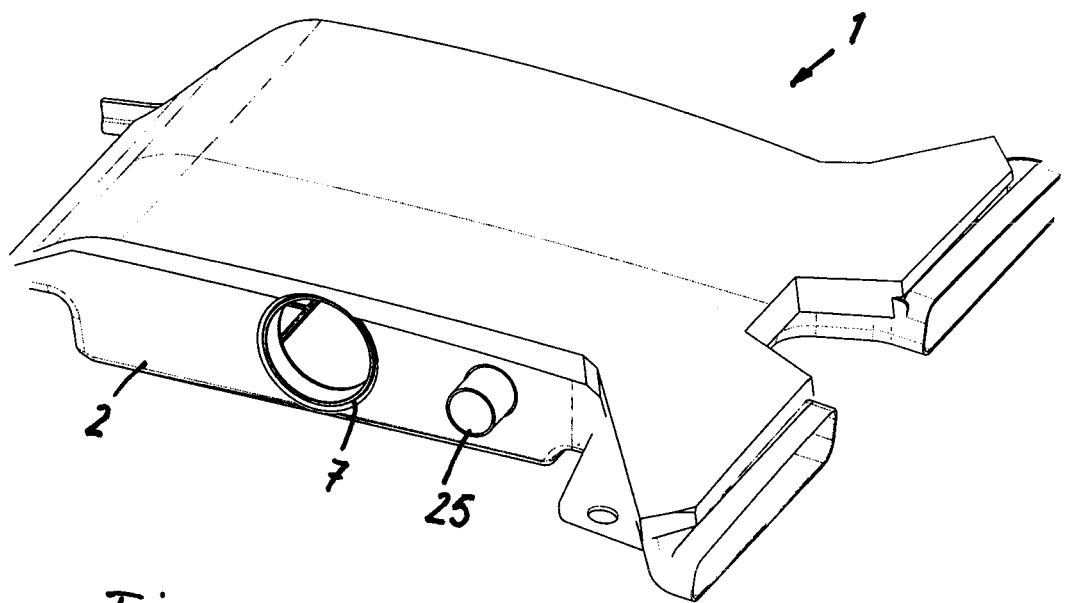
FIG. 17 shows a perspective view of a filter device with a filter insert according to FIGS. 15 and 16.
Figure 18:
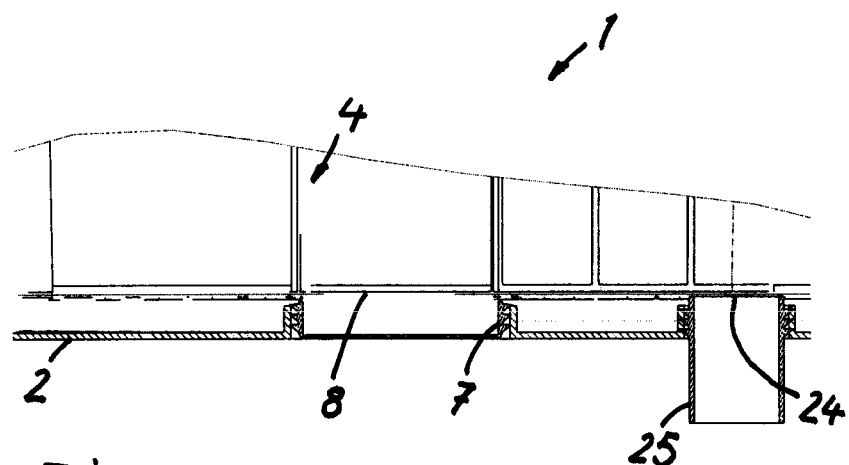
FIG. 18 shows a sectional view of the filter device from FIG. 17.

FIG. 14 shows another design variant of a filter device 1 in which two separate filter inserts 4 are received in the receiving space 3 of the filter housing 2. The filter inserts 4 are of equal construction and, like in the first exemplary embodiment, each consists of two cross-sectionally U-shaped filter elements 5 on diagonally opposing sides of an outflow pipe 6 that is connected to a housing-side nozzle 7.

FIGS. 15 to 18 show another exemplary embodiment of a filter insert 4 and filter device 1 with a filter insert. The filter insert 4 depicted in FIGS. 15 and 16 has basically the same construction as the filter insert shown in FIGS. 11 and 12 and includes a centrally arranged outflow pipe 6 as well as two diagonally opposing filter elements 5 provided with a U-shaped cross section whose open U-side borders the outflow pipe 6. The filter elements 5 are flowed through in the transverse direction with respect to the longitudinal axis of the outflow pipe 6, the filtered side of the filter elements 5 being connected via flow openings in the wall of the outflow pipe 6 to the interior of the outflow pipe, whereby the filtered fluid is discharged axially via the outflow pipe 6 and the front-side outflow opening 8, which is immediately adjacent to the housing nozzle 7.

In addition to the outflow opening 8, a second outlet referred to as a secondary outflow opening 24 is provided on the filtered side of the filter insert 4. The secondary outflow opening 24 is located on the same front side of the filter insert as the primary outflow opening 8, but with a parallel offset. The secondary outflow opening 24 is introduced into the end plate 11 and, in relation to the central outflow opening 8, is laterally offset and adjacent to the U-shape of one of the two filter elements 5. A secondary outflow opening 24 is provided only in the region of the filter element 5, whereas the second filter element 5 has no such secondary outflow opening. However, it can be expedient to provide on both filter elements 5 a respective secondary outflow opening that is offset with respect to the central outflow opening 8. Furthermore, it is possible to arrange the secondary outflow opening 24 on the front side of the filter element opposite the primary outflow opening 8.

A secondary nozzle 25 is associated with the secondary outflow opening 24 and, when mounted in the filter housing 2 (FIGS. 17, 18), projects through a recess in the side wall of the filter housing 2. The secondary nozzle 25, like the housing nozzle 7 associated with the primary outflow opening 8, is provided with a groove portion on the outer lateral surface with which the nozzles 7, 25 are seated in a frictional or force-fitted manner in the recesses in the side wall of the filter housing 2.

Figure 19:
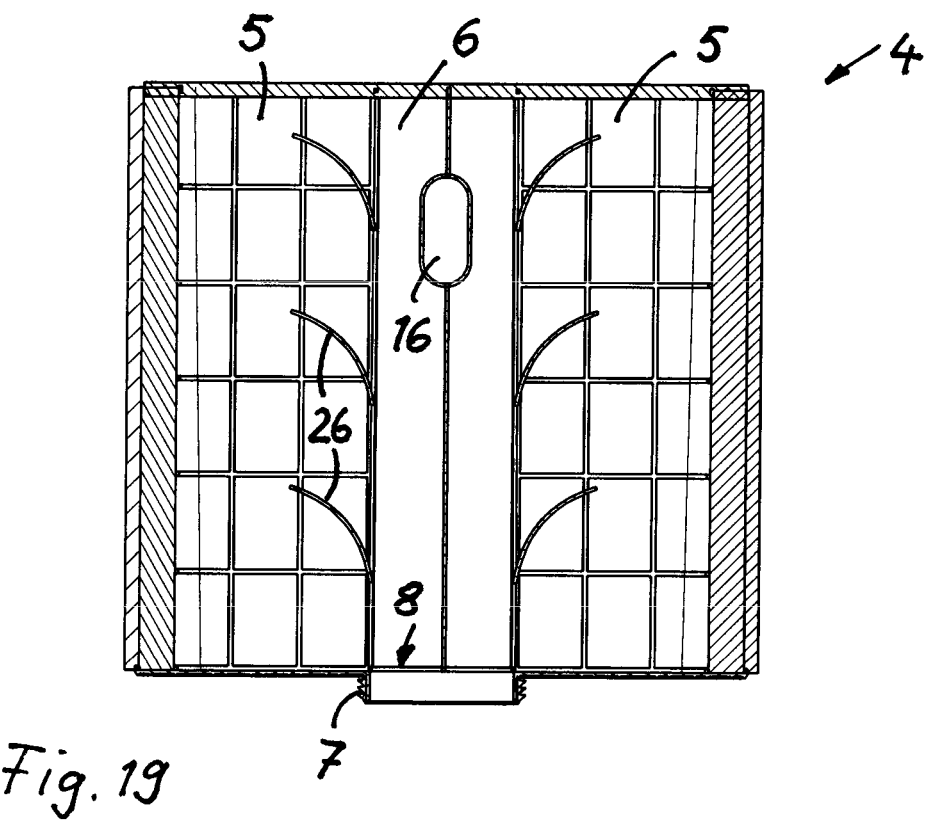
FIG. 19 shows a top view of another embodiment of a filter insert.

FIG. 19 shows another exemplary embodiment of a filter insert 4 that has basically the same construction as in the exemplary embodiment according to FIGS. 11, 12. U-shaped filter elements, whose open U-side is immediately adjacent to the outflow pipe 6, are respectively located on diametrically opposed sides of an outflow pipe 6. Cleaned gas on the interior of the filter elements 5 is conveyed via flow openings into the outflow pipe 6 and discharged from same axially via a front-side outflow opening 8.

Flow-conducting elements 26, embodied so as to be curved, are located on the outer wall of the outflow pipe 6 and extend inward from the outer wall of the outflow pipe 6 in the direction of the respective filter elements 5. The flow-conducting elements [2]6 are intended to support the discharging of the cleaned gas from the interior of the filter elements 5 via the flow openings in the wall into the outflow pipe 6. Several flow-conducting elements 26 are distributed over the axial length of the outflow pipe 6 and extend into each of the two diametrically opposed filter elements 5.

Another exemplary embodiment of a filter insert 4 is shown in FIGS. 20 to 24. The filter insert 4 includes a filter element 5 having an elongate cross section and enclosing an interior space that forms the clean space for the fluid to be cleaned, which flows radially from the outside to the inside through the filtering means of the filter element 5. The cleaned fluid is discharged from the inner-lying clean space axially via an outflow opening 8, whose longitudinal axis coincides with the longitudinal axis of the filter element 5. The outflow opening 8 is formed by a flow ring 29 of a connecting piece 27, which includes, in addition to the flow ring 29, two tabs 30 and 31, which are integrally formed with the flow ring 29. The tabs 30 and 31 are located on a front side of the flow ring 29 and project in the installed state into a recess 28, which is open at the edge and introduced into the filter element 5 in the region of a front side.

The recess 28 extends over the entire height of the filter element 5—with respect to the longitudinal axis 32 of the filter element—so the recess 28 extends both through the lower and the upper layer of the filter element. The recess 28 has a rounded cross section that is particularly oval-shaped and includes about half of an oval.

The cross-sectional surface of the tabs 30 and 31 is adapted to the recess 28. In the installed state, the tabs 30 and 31 project into the recess 28 in the region of the opposing outer sides on the long sides of the filter element 5. The overall surface area of the tabs 30 and 31 is preferably slightly larger than the corresponding surface area of the recess 28, in which case each tab 30 and 31 rests in a flow-tight manner on the respective outer side of the filter element 5 or is connected in a flow-tight manner to the outer side, for example through welding or adhesion.

The tabs 30 and 31 are convex with an outwardly oriented curvature. As can be seen from the perspective representations according to FIGS. 20 and 24 as well as from the side view according to FIG. 23, an additional flow path aligned orthogonally to the longitudinal axis 32 is created for the effluent cleaned fluid from the interior of the filter element 5. In the region of the recess 28, a portion of the cleaned fluid runs orthogonally to the longitudinal axis 28 in the direction of the tabs 30 and 31 and is then diverted in the axial direction by the curvature on the inner wall of each tab 30, 31. The majority of the flow can flow off immediately in the axial direction via the flow ring 29.

In the region of each front side, the filter element 5 is provided with an end plate 10 and 11, respectively. The end plate 11 on the side adjacent to the recess 28 can be connected to the connecting piece 27 and lies between the tabs 30 and 31. A flow opening is disposed in the end plate 11 that lies coaxial to the outflow opening 8.

A longitudinal slot 33, through which cleaned fluid can also be discharged from the filter element 5, is disposed in the end plate 10, which is arranged on the side opposite the connecting piece 27 on the front side of the filter element 5.

Figure 20:
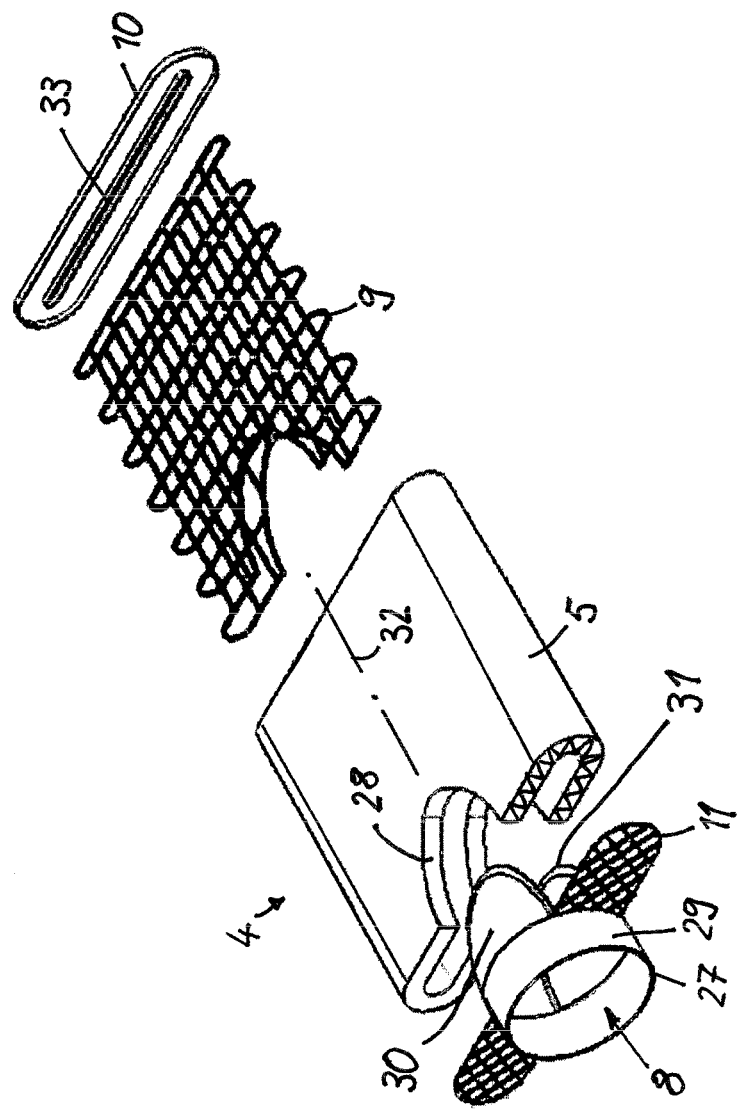
FIG. 20 shows an exploded view of a filter insert with a filter element with an elongate cross section, a recess being disposed in the filter element in the region of a front side into which a connecting piece is inserted.

As is indicated schematically in FIG. 20 on the front side with the recess 28, the filter element 5 is embodied as a folded filter.

Furthermore, a supporting frame 9 that imparts additional stability to the filter element 5 is integrated into the filter element 5. A recess corresponding to the recess 28 in the filter element 5 is also disposed in the supporting frame 9 adjacent to a front side.

As can be seen in FIG. 23, the filter element 5 has, with respect to the longitudinal axis 32, a cone angle α at which the longitudinal perimeter sides of the filter element are inclined in relation to the longitudinal axis. As a result, the area cross section that is enclosed by the opposing end plates 11 and 10 of the filter element 5 changes. In the region of the connecting piece 27, which is inserted with its tabs 30 and 31 into the recess 28 of the filter element 5, the front end plate 11 of the filter element has a larger enclosed cross section than on the opposing rear end plate 10. The cone angle α lies in a range, for example, from no more than 5° or no more than 2°.

What is claimed is:

1. A filter insert for a filter device, comprising:
a filter element arranged on a longitudinal axis extending there through;
a front-side flow opening arranged on the front side of the filter element with the longitudinal axis extending through the flow opening;
wherein the filter element has an elongate cross section; and
wherein the filter element has, with respect to the longitudinal axis, at least one flattened portion with a reduced radial extension or a through hole along the periphery of the flow opening;
wherein the shortest interior distance (a) in the filter element immediately adjacent to the front-side flow opening is shorter than the inside diameter (d) of the front-side flow opening; and
wherein the front-side flow opening is arranged on the filter element on a flow pipe around which the filter element engages at least partially, at least one flow opening being disposed in the wall of the flow pipe in a section around which the filter element engages.

2. The filter insert as set forth in claim 1, wherein
the filter element encloses a clean space at least partially within an interior of the filter element; and
wherein the front-side flow opening on the filter element is in flow communication with the clean space.

3. The filter insert as set forth in claim 1, wherein
the longitudinal axis extending through the front-side flow opening lies transverse to a direction of flow of the filter element.

4. The filter insert as set forth in claim 1, wherein
a plug-in part is plugged into the flow pipe, the plug-in part being shorter in length than the flow pipe.

5. The filter insert as set forth in claim 4, wherein
the plug-in part is plugged via the front-side flow opening into the flow pipe.

6. The filter insert as set forth in claim 5, wherein
the plug-in part has a tulip-shaped widening in a region arranged in the flow pipe.

7. The filter insert as set forth in claim 1, wherein
flow-conducting elements are arranged on an exterior side of the flow pipe.

8. The filter insert as set forth in claim 1, wherein
transverse to the longitudinal axis of the flow opening, a hollow base for connecting to a housing-side fastening element is introduced into the filter insert, which is separated in a flow-tight manner from a filtered side of the filter element;
wherein the hollow base projects through an interior of the filter element.

9. The filter insert as set forth in claim 1, wherein
the hollow base is arranged within the flow pipe.

10. The filter insert as set forth in claim 1, wherein
the filter element engages around the front-side flow opening over an angular range of at least 180 degrees about the longitudinal axis;
wherein the filter element has a through hole on a periphery of the front-side flow opening that is no more than 90 degrees with respect to a circumferential direction of the front-side flow opening.

11. The filter insert as set forth in claim 1, wherein
the filter element engages around the front-side flow opening over an angular range of no more than 90 degrees;
wherein two opposing filter elements are arranged on the front-side flow opening.

12. The filter insert as set forth in claim 1, wherein
an interior distance of the filtering medium of the filter element is shorter than an inside diameter of the front-side flow opening.

13. The filter insert as set forth in claim 1, wherein
the filter element is embodied as a folded filter, having folded filtering medium.

14. The filter insert as set forth in claim 1, wherein
the filter element has an at least approximately U-shaped cross section;
wherein legs of the U-shaped cross section enclose a filtered side of the filter element; and
wherein the front-side flow opening lies transverse to a longitudinal extension of the legs.

15. The filter insert as set forth in claim 1, wherein
a secondary outflow opening is arranged on a filtered side of the filter element and spaced apart from the front-side flow opening;
wherein the secondary outflow opening is associated with a secondary nozzle in a filter housing in which the filter element is arranged.

16. A filter insert for a filter device, comprising:
a filter insert with a filter element, according to claim 1;
wherein an open recess is arranged in the filter element proximate to the front side into which a connecting piece having the front-side flow opening is inserted.

17. The filter insert as set forth in claim 16, wherein
the connecting piece has two tabs covering the recess.

18. The filter insert as set forth in claim 17, wherein
at least one tab of the two tabs is convexly arched and rises over an outside of the filter element.

19. The filter insert as set forth in claim 1, wherein
the filter element encloses a different-sized area face at its opposing end plates;
wherein a transition from the front end plate to the opposing rear end plate is conical.

20. The filter device as set forth in claim 1, wherein the shortest interior distance (a) in the filter element immediately adjacent to the front-side flow opening along a tangent to an outside diameter of the flow opening is shorter than the inside diameter (d) of the front-side flow opening;
wherein the flow pipe is centered on and elongated along the longitudinal axis; and wherein the filter element has a first interior distance in the filter element in a first direction traverse to the longitudinal axis is shorter than a second interior distance in a different second direction traverse to the longitudinal axis.

21. A filter device, comprising:
a filter insert according to claim 1;
a filter housing with a receiving space for receiving the filter insert;
a housing nozzle arranged on the filter housing and communicating with a filtered side of the filter element whose diameter is at least 50% of a height of the receiving space for the filter insert.

22. The filter device as set forth in claim 21, wherein
the height of the receiving space in the filter housing is no more than half of a width and/or a length of the receiving space.

23. A filter insert for a filter device, comprising:
a filter element arranged on a longitudinal axis extending there through;
a front-side flow opening arranged on the front side of the filter element with the longitudinal axis extending through the flow opening;
wherein the filter element has an elongate cross section; and
wherein the filter element has, with respect to the longitudinal axis, at least one flattened portion with a reduced radial extension or a through hole along the periphery of the flow opening;
wherein the shortest interior distance (a) in the filter element immediately adjacent to the front-side flow opening is shorter than the inside diameter (d) of the front-side flow opening, and, the filter element engages around the front-side flow opening over an angular range of at least 180 degrees about the longitudinal axis;
wherein the filter element has a through hole on a periphery of the front-side flow opening that is no more than 90 degrees with respect to a circumferential direction of the front-side flow opening.

24. The filter insert as set forth claim 23, wherein
the front-side flow opening is arranged on the filter element on a flow pipe around which the filter element engages at least partially, at least one flow opening being disposed in the wall of the flow pipe in a section around which the filter element engages.

25. A filter insert for a filter device, comprising:
a filter element arranged on a longitudinal axis extending there through;
a front-side flow opening arranged on the front side of the filter element with the longitudinal axis extending through the flow opening;
wherein the filter element has an elongate cross section; and
wherein the filter element has, with respect to the longitudinal axis, at least one flattened portion with a reduced radial extension or a through hole along the periphery of the flow opening;
wherein the shortest interior distance (a) in the filter element immediately adjacent to the front-side flow opening is shorter than the inside diameter (d) of the front-side flow opening, and, the filter element has an at least approximately U-shaped cross section;
wherein legs of the U-shaped cross section enclose a filtered side of the filter element; and
wherein the front-side flow opening lies transverse to a longitudinal extension of the legs.

* * * * *